United States Patent [19]
Kito

[11] 3,971,885
[45] July 27, 1976

[54] REMOTE CONTROL SYSTEM FOR PASSENGER CONVEYORS

[75] Inventor: Katsumi Kito, Inazawa, Japan

[73] Assignee: Mitsubishi Denki Kabushiki Kaisha, Japan

[22] Filed: July 17, 1975

[21] Appl. No.: 596,609

[30] Foreign Application Priority Data
July 17, 1974 Japan.................................. 49-82512

[52] U.S. Cl............................ 178/6.8; 178/DIG. 1; 187/29 R; 318/103
[51] Int. Cl.².......................................... H04N 7/18
[58] Field of Search................... 178/6.8, DIG. 1; 187/29 R, 29 Y, 29 AB; 318/103; 340/278

[56] References Cited
UNITED STATES PATENTS

| | | | |
|---|---|---|---|
| 2,602,524 | 7/1952 | Shirley............................ | 178/DIG. 1 |
| 3,168,164 | 2/1965 | Kiely................................. | 187/29 R |
| 3,641,263 | 2/1972 | Rhoads........................... | 178/DIG. 1 |

Primary Examiner—Howard W. Britton
Attorney, Agent, or Firm—Robert E. Burns; Emmanuel J. Lobato; Bruce L. Adams

[57] ABSTRACT

One monitor pushbuttons for each of two passenger conveyors is pushed to energize a relay through normally closed contacts of a similar relay and monitor pushbutton for the other passenger conveyor to monitor the associated passenger conveyor by a television receiver. In order to remotely start and stop each passenger conveyor, a contactor for operating an associated electric motor is connected to a remotely operated start pushbutton through normally open contacts of the relay and to a remotely operated stop pushbutton. When energized, the relay and contactor are self-held.

6 Claims, 2 Drawing Figures

REMOTE CONTROL SYSTEM FOR PASSENGER CONVEYORS

BACKGROUND OF THE INVENTION

This invention relates to improvements in a control system for remotely controlling the operation of passenger conveyors such as escalators, moving walks etc.

Recently passenger conveyors have been strikingly propagated so that they are indispensable to equipments disposed in departmentstores, railway stations etc. It has been already practiced to selectively operate passenger conveyors at the high and low speeds to improve the transport capacity thereof, to halt them during the light traffic for the purpose of saving the electric power consumed by the passenger conveyors and so on. In addition, it has been proposed to efficiently operate a plurality of passenger conveyors by controlling the number thereof simultaneously put in operation, the operating direction and speed thereof etc.

As it is troublesome to manually accomplish this control of operation of passenger conveyors, a central control room or the like is generally provided to collectively control the passenger conveyors. This results in the necessity of using television receivers to monitor the operation of the passenger conveyors because of their remote operation. More specifically, one television camera is disposed adjacent to each of the passenger conveyors to pick up the movement of the latter and remotely operated switches operatively coupled to each passenger conveyor is operated while the movement thereof is monitored by viewing it reproduced on an associated television receiver.

Under these circumstances, it can not be said that there will be no case where some remotely operated switch may be actuated with forgetting the monitoring of the passenger conveyor through the television receiver. In that event the passenger conveyor to be monitored is fully out of the control resulting in a serious danger. Even when one of a plurality of passenger conveyors is monitored through a television receiver, a remotely operated switch operatively coupled to another passenger conveyor may be erroneously operated. This is very dangerous as much as a failure of the monitoring. As such erroneous operations due to illusions are liable to be usually caused. This has brought about problems in collectively controlling the operation of passenger conveyors.

SUMMARY OF THE INVENTION

The present invention provides a control system for remotely controlliing the operation of a plurality of passenger conveyors, comprising one monitor switch for each of the passenger conveyors, television receiver means responsive to the operation of each of the monitor switches to remotely monitor the operation of that passenger conveyor operatively associated with the operated monitor switch, remotely operated switch means operative to remotely control the operation of the respective passenger conveyors, and means for remotely controlling the operation of each of the passenger conveyors only when the latter is monitored by said television receiver means.

Accordingly it is an object of the present invention to provide a new and improved control system for remotely controlling the operation of a plurality of passenger conveyors free from dangers that some of the passenger conveyors are erroneously operated without the monitoring operation performed, and that passenger conveyor not monitored is erroneously operated in the monitoring operation.

BRIEF DESCRIPTION OF THE DRAWINGS

The present invention will become more readily apparent from the following detailed description taken in conjunction with the accompanying drawing in which.

DESCRIPTION OF THE PREFERRED EMBODIMENT

The present invention will now be described in conjunction with a pair of passenger conveyors disposed at different positions in a building. For example, one of the passenger conveyors is disposed across a first and a second floor of the building and called a passenger conveyor No. 1 while the other conveyor is disposed across the second and third floors thereof and called a passenger conveyor No. 2.

Figure 1:
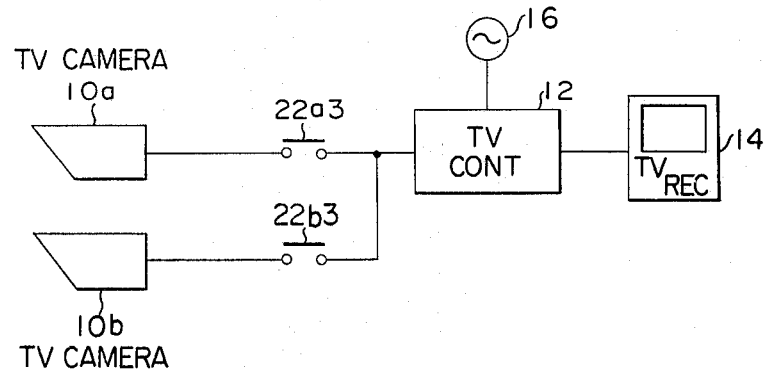
FIG. 1 is a block diagram of a control system for controlling the operation of passenger conveyors constructed in accordance with the principles of the present invention.

Referring now to FIG. 1 of the drawing, it is seen that an arrangement disclosed herein comprises a pair of television cameras 10a and 10b for picking up a pair of passenger conveyors No. 1 and No. 2 not shown, a television controller 12 selectively connected to the television cameras 10a and 10b, and, a television receiver 14 disposed in a central control room (not shown) to be connected to the television controller 12. A source of electric power 16 is shown in FIG. 1 as being connected to the television controller 12 for the purpose of driving a television system including the above-mentioned components 10a, 10b, 12 and 14.

The television controller 12 receives a video signal from a selected one of the television camera 10a or 10b to process the video signal. The resulting image signal from the television controller 12 is supplied to the television receiver 14 where the operation of the selected passenger conveyor is reproduced for monitoring purposes.

Figure 2:
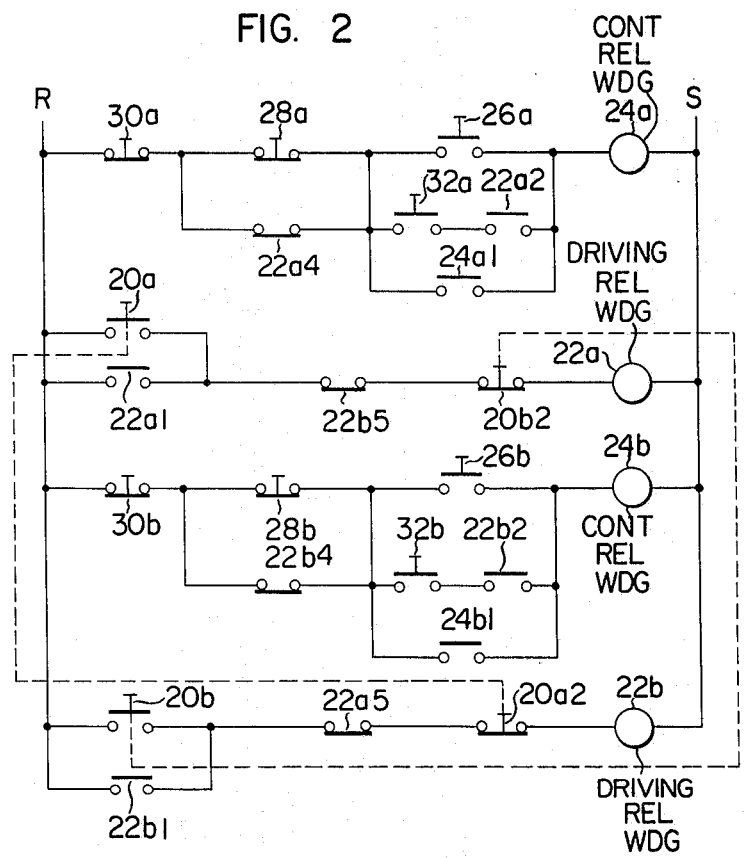
FIG. 2 is a straight-line circuit diagram of controls used with the arrangement shown in FIG. 1.

In order to control the passenger conveyors and selectively reproduce them on the television receiver 14, a control circuit is shown in FIG. 2 as being connected across a pair of electrical conductors R and S representing a source of alternating current. It will readily be understood that control elements operatively coupled to each of the passenger conveyors are similar to and interconnected in the same manner as those operatively coupled to the other passenger conveyor. Thus the description will be made in detail in conjunction with one of the passenger conveyors, in this case, the passenger conveyor No. 1.

As shown in FIG. 2, a self-restoring switch or pushbutton 20a for monitoring the passenger conveyor No. 1 includes a set of normally open contacts 20a1 is connected on one side to the electrical conductor R and on the other side to a set of normally closed contacts 22b5 of a driving relay including a set of normally open contacts 22b3 connected across the television camera 10b and the television controller 12 (see FIG. 1). The set of normally closed contacts 22b5 is also connected on one side to the electrical conductor R through a set of normally open contacts 22a1 of a driving relay including a set of normally open contacts 22a3 connected across the television camera 10a and the television controller 12 (see FIG. 1). The set of normally closed contacts 22b5 has the other side connected to an operating winding 22a of the driving relay for the passenger conveyor No. 1 through a set of normally closed contacts 20b2 of a self-restoring pushbutton 20b for monitoring the passenger conveyor No. 2. The operating relay winding 22a is also connected to the electrical conductor S and the pushbutton 20a further includes a set of normally closed contacts 22a2 interlocking with the normally open contacts 22a1 thereof.

In order to drive an electric motor (not shown) for operating the passenger conveyor No. 1, a controller not shown includes an operating winding 24a connected at one end to the electrical conductor S and at the other end to normally open start pushbutton 26a disposed on the passenger conveyor No. 1 (not shown) to start the latter. The start pushbutton 26a is connected to the electrical conductor R through a remotely operated normally closed stop pushbutton 28a disposed in the central control room (not shown) and a normally closed stop pushbutton 30a disposed on the passenger conveyor No. 1 (not shown).

The start pushbutton 26a is connected across a parallel combination of a remotely operated normally open start pushbutton 32a and a set of normally open contacts 22a2 of the driving relay and also across a set of normally open contacts 24a1 of the controller. The remotely operated start pushbutton 32a is disposed in the central control room (not shown). Further the remotely operated stop pushbutton 28a is connected across a set of normally closed contacts 22a4 of the driving relay for the passenger conveyor No. 1.

In FIG. 2 it is seen that pushbutton, contacts and operating windings corresponding to those as above described are provided for the passenger conveyor No. 2. Such pushbuttons, contacts and windings for the passenger conveyor No. 2 are designated by like reference numerals denoting the corresponding ones for the passenger conveyor No. 1 and suffixed with the reference character b in place of the a. For example, the 32b designates a remotely operated start pushbutton for the passenger conveyor No. 2.

Assuming that the passenger conveyors No. 1 and No. 2 are not monitored by the respective television cameras 10a and 10b, the start pushbutton 26a is pushed to complete a current path including conductor R-stop pushbutton 30a-remote stop pushbutton 28a-start pushbutton 26a-controller winding 24a conductor S.

This results in the energization of the controller winding 24a. Thus the set of normally open contacts 24a1 is closed to form a self-holding circuit for the controller winding 24a. This engergization of the controller winding 24a causes the electric motor for the passenger conveyor No. 1 (not shown) to be started. Thus the passenger conveyor No. 1 is put in operation. This is true in the case of the passenger conveyor No. 2.

In order to stop either or both of the passenger conveyors No. 1 and No. 2, either or both of the stop pushbuttons 30a and 30b, can be pushed. This causes the deenergization of the controller winding or windings 24a or/and 24b to disconnect the associated electric motor or motors from a source of alternating current. At the same time, electromagnetic brake or brakes (not shown) is or are activated to stop the associated passenger conveyor or passenger conveyors.

Under these circumstances, remote start pushbutton 32a may be erroneously pushed. This does not result in the energization of the controller winding 24a because the set of contacts 22a2 is in its open position. Therefore the passenger conveyor No. 1 is not brought into operation. On the other hand, if the remote stop pushbutton 28a is pushed during the operation of the passenger conveyor No. 1 then the latter continues to be operated because the set of contacts 22a4 is in its closed position to maintain the controller winding 24a energized.

The foregoing is equally applied to the passenger conveyor No. 2.

The remote control of the operation of the passenger conveyors No. 1 and No. 2 must relay on the monitoring by the television system involved.

It is assumed that the operation of the passenger conveyor No. 1 is monitored by the television system. Under the assumed condition, the monitor pushbutton 20a is pushed to complete a current path including:

conductor R-start contacts 20a1-contacts 22b5-contacts 20b2-relay winding 22a-conductor S.

to energize the operating winding 22a of the relay for driving the television camera 10a. Also the set of contacts 22a1 is closed to form a self-holding circuit for the winding 22a.

The pushing of the monitor pushbutton 20a also closes the set of contacts 22a3 to cause a scene picked up by the television camera 10a to be reproduced on the television receiver 14 permitting the monitoring the operation of the passenger conveyor No. 1. Simultaneously the set of contacts 22a2 is closed while the sets of contacts 22a4 and 22a5 are opened. Under these circumstances, the remote start pushbutton 32a can be pushed to complete a current path including conductor R-stop pushbutton 30a-remote stop pushbutton 28a-remote start pushbutton 32a-contact 22a2-controller winding 24a-conductor S. to energize the controller winding 24a. This energization of the controller winding 24a causes the closure of contacts 24a1 to form a self-holding circuit for the controller winding 24a thereby starting the passenger conveyor No. 1. If the remote stop pushbutton 28a is pushed then the controller winding 24a is deenergized because the set of contacts 22a4 is put in its open position. This results in the stop of the passenger conveyor No. 1.

It will readily be understood that the passenger conveyor No. 1 being monitored by the television camera 10a can be started and stopped by operating the start and stop pushbuttons 26a and 30a respectively without any hindrance.

If what is to be monitored is desired to change from the passenger conveyor No. 1 being now monitored to the passenger conveyor No. 2 then the monitor pushbutton 20b for the passenger conveyor No. 2 is pushed. This causes the opening of the contacts 20b2 to deenergize the relay winding 22a thereby to open the contacts 22a3 resulting in the image of the passenger conveyor No. 1 disappearing from the television receiver 14. The deenergization of the relay winding 22a also causes the closure of its contacts 22a5 to complete a current path including conductor R-monitor contacts 20b1-driving contacts 22a5-monitor contacts 20a2-driving winding 22b-conductor S to energize the winding 22b. Also the set of contacts 22b1 is closed to form a self-holding circuit for the driving winding 22b. Further contacts 22b3 are closed to cause the operation of the passenger conveyor No. 2 to be reproduced on the television receiver 14. Thereafter the passenger conveyor No. 2 can be remotely controlled in the same manner as above described in conjunction with the passenger conveyor No. 1.

While the passenger conveyor No. 2 is being monitored, the remote start pushbutton 32a may be erroneously pushed. This pushing of the pushbutton 32a does not lead to the starting of the passenger conveyor No. 1 because the driving contacts 22a2 are in their open position. This results in the prevention of a danger that may occur on the passenger conveyor No. 1.

Thus it is seen that the present invention provides a remote control system of passenger conveyors including one monitor switch for each passenger conveyor and remotely operated switches, the arrangement being such that only when a selected one of the passenger conveyors is being monitored by a television receiver involved after the operation of the associated monitor switch, it is possible to remotely operate the selected passenger conveyor resulting from the operation of the remote operating switch. Thus there is no fear that a passenger conveyor not monitored will be erroneously operated resulting in the prevention of any danger due to the remote operation.

While the present invention has been illustrated and described in conjunction with a single preferred embodiment thereof it is to be understood that numerous changes and modifications may be resorted to without departing from the spirit and scope of the present invention. For example, the present invention is equally applicable to any desired number of passenger conveyors other than two thereof. The single television receiver has been shown as being selectively coupled to a pair of television cameras but one television receiver may be operatively coupled to each of the television cameras. That is, the number of the television receivers is not particularly restricted by the number of the television cameras as long as a single one of the passenger conveyors is always reproduced on one television receiver. In addition, the present invention may be equally applied to passenger conveyors having the high and low operating speeds in order to change one to the other of the two speeds of a selected one of the passenger conveyors while those passenger conveyors not monitored are prevented from remotely changing in speed.

What is claimed is:

1. A control system for remotely controlling the operation of a plurality of passenger conveyors, comprising one monitor switch for each of the passenger conveyors, television receiver means responsive to the operation of each of said monitor switches to remotely monitor the operation of that passenger conveyor operatively associated with the operated monitor switch, remotely operated switch means operative to remotely control the operation of the respective passenger conveyors, and means for remotely controlling the operation of each of the passenger conveyors only when the latter is monitored by said television receiver means.

2. A control system as claimed in claim 1 wherein said television receiver means comprises one television receiver having the operation of a single one of the passenger conveyors reproduced thereon at a time.

3. A control system for remotely controlling the operation of a plurality of passenger conveyors, comprising one monitor switch for each of the passenger conveyors, television receiver means responsive to the operation of each of said monitor switches to remotely monitor the operation of that passenger conveyor operatively associated to the operated monitor switch, remotely operated switch means operative to remotely control the operation of the respective passenger conveyors, and one means interlocking with each of said monitor switches, the arrangement being such that only duration the operation of said interlocking means, said remotely operated switch means is enabled to remotely operate that passenger conveyor operatively associated with the operated interlocking means.

4. A control system as claimed in claim 3 wherein said television receiver means comprises one television receiver having the operation of a single one of the passenger conveyors reproduced thereon at a time.

5. A control system for remotely controlling the operation of a plurality of passenger conveyors, comprising one monitor switch for each of the passenger conveyors, television receiver means responsive to the operation of each of said monitor switches to remotely monitor the operation of that passenger conveyor operatively associated to the operated monitor switch, remotely operated switch means for remotely controlling the start and stop the respective passenger conveyors, and means for remotely controlling the start and stop of each of the passenger conveyors only when the latter is monitored by said television receiver means.

6. A control system as claimed in claim 5 wherein said television receiver means comprises one television receiver having the operation of a single one of the passenger conveyors reproduced thereon at a time.

* * * * *